US012097890B2

(12) United States Patent
Bharwani (10) Patent No.: US 12,097,890 B2
(45) Date of Patent: Sep. 24, 2024

(54) MIDDLEWARE SOFTWARE LAYER FOR VEHICLE AUTONOMY SUBSYSTEMS

(71) Applicant: Rivian IP Holdings, LLC, Irvine, CA (US)

(72) Inventor: Kiran Ram Bharwani, San Ramon, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/377,613

(22) Filed: Oct. 6, 2023

(65) Prior Publication Data

US 2024/0132113 A1 Apr. 25, 2024
US 2024/0227864 A9 Jul. 11, 2024

Related U.S. Application Data

(63) Continuation of application No. 17/970,393, filed on Oct. 20, 2022, now Pat. No. 11,814,086.

(51) Int. Cl.
*B60W 50/04* (2006.01)
*B60W 50/00* (2006.01)
(Continued)

(52) U.S. Cl.
CPC ...... *B60W 60/005* (2020.02); *B60W 50/0098* (2013.01); *B60W 50/045* (2013.01);
(Continued)

(58) Field of Classification Search
CPC ........... B60W 60/005; B60W 50/0098; B60W 50/045; B60W 50/14; B60W 2710/18;
(Continued)

(56) References Cited

U.S. PATENT DOCUMENTS 8,620,078 B1 12/2013 Chapleau et al.
2014/0310209 A1 10/2014 Kang et al.
(Continued)

FOREIGN PATENT DOCUMENTS

KR 102250169 B1 5/2021
WO 2017125788 A1 7/2017
WO 2022226511 A1 10/2022

OTHER PUBLICATIONS

Comma.ai, "A panda and a cabana: How to get started car hacking with comma.ai," blog post, https://blog.comma.ai/a-panda-and-a-cabana-how-to-get-started-car-hacking-with-comma-ail , published Jul. 7, 2017. (Year: 2017).

(Continued)

*Primary Examiner* — Daniel M. Robert
(74) *Attorney, Agent, or Firm* — BakerHostetler (57) ABSTRACT

A computing system for a vehicle may include processors to execute instructions to receive, by a middleware software layer of the computing system, messages published by one or more of a plurality of autonomous processing modules, and determine, by the middleware software layer, and based on the published messages, whether a similarity comparison of a first vehicle parameter and a second vehicle parameter satisfy a similarity threshold value. The first vehicle parameter and the second vehicle parameter relate to the messages published by the one or more autonomous processing modules. In response to determining that the similarity comparison of the first vehicle parameter and the second vehicle parameter does not satisfy the similarity threshold value, provide, by the middleware software layer, an instruction to a control system to cause the vehicle to perform an action, and cause, by the control system, the vehicle to perform the action.

19 Claims, 7 Drawing Sheets

(51) Int. Cl.
  *B60W 50/14* (2020.01)
  *B60W 60/00* (2020.01)
  *G06F 9/54* (2006.01)

(52) U.S. Cl.
  CPC ............. *B60W 50/14* (2013.01); *G06F 9/546* (2013.01); *B60W 2710/18* (2013.01); *B60W 2710/20* (2013.01); *B60W 2720/10* (2013.01); *B60W 2720/106* (2013.01)

(58) Field of Classification Search
  CPC ......... B60W 2710/20; B60W 2720/10; B60W 2720/106; G06F 9/546
  See application file for complete search history.

(56) References Cited

U.S. PATENT DOCUMENTS

| | | | |
|---|---|---|---|
| 2017/0090480 A1 | 3/2017 | Ho et al. | |
| 2017/0364070 A1* | 12/2017 | Oba | B60K 28/066 |
| 2018/0032079 A1* | 2/2018 | Nishi | G08G 1/16 |
| 2018/0364885 A1 | 12/2018 | Melencio | |
| 2019/0097932 A1 | 3/2019 | Buczek et al. | |
| 2019/0101410 A1 | 4/2019 | Kuper et al. | |
| 2019/0109821 A1 | 4/2019 | Clark et al. | |
| 2019/0113916 A1* | 4/2019 | Guo | A61B 5/6893 |
| 2019/0258721 A1* | 8/2019 | Guo | H04L 67/535 |
| 2019/0324450 A1 | 10/2019 | Lurie et al. | |
| 2019/0354111 A1* | 11/2019 | Cheng | H04W 4/44 |
| 2020/0057441 A1 | 2/2020 | Wang et al. | |
| 2020/0110948 A1* | 4/2020 | Pfeifle | G08G 1/0175 |
| 2020/0180612 A1* | 6/2020 | Finelt | G05D 1/0214 |
| 2020/0200869 A1 | 6/2020 | Alvarez et al. | |
| 2020/0331484 A1 | 10/2020 | Rodriguez Bravo et al. | |
| 2020/0331495 A1* | 10/2020 | Bracquemond | B60W 60/0016 |
| 2021/0018590 A1 | 1/2021 | Grau | |
| 2021/0245779 A1 | 8/2021 | Suzuki | |
| 2021/0309167 A1 | 10/2021 | Gourari et al. | |
| 2022/0075536 A1 | 3/2022 | Swami et al. | |
| 2022/0096249 A1* | 3/2022 | Rouse | A61B 5/7221 |
| 2022/0126865 A1* | 4/2022 | Marcotte | B60W 50/029 |
| 2022/0126872 A1 | 4/2022 | Han et al. | |
| 2022/0166857 A1 | 5/2022 | Fan et al. | |
| 2022/0204043 A1* | 6/2022 | Xu | B60W 60/0051 |
| 2022/0247696 A1 | 8/2022 | He et al. | |
| 2022/0315052 A1 | 10/2022 | Oboril et al. | |
| 2022/0329522 A1 | 10/2022 | Maciocco et al. | |
| 2022/0365764 A1 | 11/2022 | Shalem | |
| 2023/0298301 A1* | 9/2023 | Margines | G06T 7/90 382/104 |

OTHER PUBLICATIONS

Comma.ai, "A tour through openpilot," blog post, https://blog.comma.ai/a-tour-through-openpilot/ , published Dec. 3, 2019. (Year: 2019).

Comma.ai, "How does openpilot work?" blog post, https://blog.comma.ai/how-does-openpilot-work/, published Jun. 26, 2017. (Year: 2017).

Dataspeedinc (see the YouTube video clip entitled "Dataspeed ADAS By-Wire Kit," uploaded on Jul. 12, 2019 by user "Dataspeedinc", retrieved from internet on Jun. 13, 2022: https://www.youtube.com/watch?v=Grly8qvWRqU} , hereinafter DataspeedInc. (Year: 2019).

Final Office Action mailed May 17, 2023, for U.S. Appl. No. 17/970,393, filed Oct. 20, 2022, 43 pages.

Non-Final Office Action mailed Jan. 27, 2023, for U.S. Appl. No. 17/970,393, filed Oct. 20, 2022, 29 pages.

Notice of Allowance mailed Jul. 7, 2023, for U.S. Appl. No. 17/970,393, filed Oct. 20, 2022, 12 pages.

Shigeki Tomoyama, "Toyota's Connected & Maas Strategy," https://global.toyota/pages/global_toyota/ir/financial-results/2019_3q_competitiveness_en.pdf, p. 13, published Feb. 6, 2019. (Year: 2019).

\* cited by examiner

MIDDLEWARE SOFTWARE LAYER FOR VEHICLE AUTONOMY SUBSYSTEMS

CROSS-REFERENCE TO RELATED APPLICATIONS

This application is a continuation of U.S. patent application Ser. No. 17/970,393, filed Oct. 20, 2022, the content of which is incorporated herein by reference in its entirety.

INTRODUCTION

Autonomous or semi-autonomous vehicles may allow for the function of a human driver to be supplemented or completely replaced by one or more computer-based driving systems. In some instances, to facilitate communication across the various modules and submodules that may comprise an autonomous or semi-autonomous vehicle, the vehicle may include a controller area network (CAN) bus. The CAN bus may include a secure communications bus for interconnecting a number of motion control actuator electronic control units (ECUs) to share information between each other and/or with one or more other components that may be interconnected to the CAN bus. Specifically, the number of ECUs may be utilized to receive instructions from the computer-based modules and submodules and control one or more respective actions or functions of the vehicle in accordance with the automotive safety regulations and the traffic laws of the jurisdiction in which the vehicle may be operating. However, relying too heavily on the hardware-based systems and ECUs of vehicles for managing processing and communications may impede the overall security, fault-tolerance, and reliability of such systems and potentially increase costs.

BRIEF SUMMARY

Embodiments of the present disclosure are directed toward a middleware software layer of a computing system of an autonomous or semi-autonomous vehicle that may be utilized to manage processing and communications of an autonomy stack of the vehicle to improve overall security, fault-tolerance, and reliability of the various modules and submodules comprising the autonomous or semi-autonomous vehicle. For example, in certain embodiments, the middleware software layer may include a set of software instructions that may be utilized for processing and communications in a real time operating system (RTOS) of a distributed vehicle network environment. For example, in one embodiment, the computing system (e.g., advanced driver assistance system (ADAS)) of the vehicle may be programmably retrofitted with instructions including the middleware software layer. Specifically, for autonomous or semi-autonomous vehicles, the middleware software layer, in conjunction with a hardware abstraction layer (HAL), may translate and abstract information of the vehicle operating system, autonomy stack, controller area network (CAN) bus, high-level and low-level applications data, and so forth, for analyzing, managing, and segmenting these various data to improve the vehicle autonomy operation of the vehicle. Thus, the middleware software layer may serve as a reconfigurable and/or retrofittable software-based system for managing processing and communications of the autonomy stack of the vehicle to improve overall security, fault-tolerance, and reliability of the various modules and submodules comprising an autonomous or semi-autonomous vehicle, and may be further scalable for Level-1 autonomous driving, Level-2 autonomous driving, Level-3 autonomous driving, Level-4 autonomous driving, and Level-5 autonomous driving.

In certain embodiments, one or more processors may receive, by a middleware software layer of the computing system, one or more messages published by at least one of a plurality of autonomous processing modules of the computing system. For example, the vehicle may be configured to operate in accordance with one or more of Level-1 autonomous driving, Level-2 autonomous driving, Level-3 autonomous driving, Level-4 autonomous driving, or Level-5 autonomous driving. In one embodiment, the middleware software layer may include a data distribution service (DDS) middleware. In one embodiment, the middleware software layer may include a publish-subscribe (Pub-Sub) architecture configured to allow the middleware software layer to subscribe to one or more of a plurality of topics associated with the plurality of autonomous processing modules. In some embodiments, the one or more processors may receive, by the middleware software layer, the one or more messages based on the subscription. In some embodiments, the plurality of autonomous processing modules may include a sensor processing module, a perception processing module, a prediction processing module, and a planning processing module. In one embodiment, the computing system was programmably retrofitted with instructions including the middleware software layer.

In certain embodiments, the one or more processors may then determine, by the middleware software layer, and based on the one or more published messages, whether a similarity comparison of a first vehicle parameter and a second vehicle parameter satisfy a threshold value, in which the first vehicle parameter and the second vehicle parameter relate to the one or more messages published by the one or more of the plurality of autonomous processing modules and independently processed by the middleware software layer. For example, in some embodiments, determining whether the similarity comparison of the first vehicle parameter and the second vehicle parameter satisfy the similarity threshold value further may include computing, by the middleware software layer, the first vehicle parameter based on one or more messages published by a first autonomous processing module of the plurality of autonomous processing module and computing, by the middleware software layer, the second vehicle parameter based on one or more messages published by a second autonomous processing module of the plurality of autonomous processing modules. In some embodiments, the second autonomous processing module may include a redundancy of the first autonomous processing module. In certain embodiments, the one or more processors may then compare, by the middleware software layer, the first vehicle parameter and the second vehicle parameter utilizing one or more safety checker mechanisms.

In certain embodiments, the first vehicle parameter may include one or more of a set of quality of service (QoS) parameters, and the second vehicle parameter may include a same one or more of the set of QoS parameters. For example, in one embodiment, the set of QoS parameters may include one or more of a throughput parameter, a reliability parameter, an intermediate delay parameter, a network capacity parameter, a packet loss parameter, a packet latency parameter, a packet delivery deadline parameter, a power consumption parameter, a network bandwidth parameter, a response time parameter, a connectivity parameter, or a path latency parameter.

In certain embodiments, in response to determining that the similarity comparison of the first vehicle parameter and the second vehicle parameter does not satisfy the similarity threshold value, the one or more processors may provide, by the middleware software layer, an instruction to a control system configured to cause the vehicle to perform one or more actions. In one embodiment, the one or more processors may then cause, by the control system, the vehicle to perform the one or more actions in accordance with the instruction. For example, in some embodiments, the control system may cause the vehicle to perform one or more actions including, for example, a disengagement, a braking, a change in velocity, a change in steering angle, a change in acceleration, a change in throttle position, or an output of one or more alerts. In certain embodiments, in response to determining that the similarity comparison of the first vehicle parameter and the second vehicle parameter satisfies the similarity threshold value, the one or more processors may forgo providing the instruction to the control system.

In certain embodiments, in response to determining that the similarity comparison of the first vehicle parameter and the second vehicle parameter does not satisfy the similarity threshold value, the one or more processors may determine, by the middleware software layer, a confidence score associated with the first vehicle parameter or the second vehicle parameter, and determine, by the middleware software layer, whether to provide the instruction to the control system based at least in part on the confidence score. In one embodiment, the one or more processors may determine the confidence score associated with the first vehicle parameter or the second vehicle parameter by determining whether to trust the first vehicle parameter or the second vehicle parameter. In certain embodiments, the middleware software layer may be configured to allocate a first memory space on the computing system for storing safety-critical functions and a second memory space on the computing system for storing non-safety-critical functions. For example, in one embodiment, the first memory space may be separate and distinct from the second memory space. In certain embodiments, the middleware software layer may be configured to allocate a first set of communication channels on the computing system for receiving and transmitting safety-critical functions and a second set of communication channels on the computing system for receiving and transmitting non-safety-critical functions. For example, in one embodiment, the first set of communication channels is separate and distinct from the second set of communication channels.

The embodiments disclosed above are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present disclosure are directed toward a middleware software layer of a computing system of an autonomous or semi-autonomous vehicle that may be utilized to manage processing and communications of an autonomy stack of the vehicle to improve overall security, fault-tolerance, and reliability of the various modules and submodules comprising the autonomous or semi-autonomous vehicle. For example, in certain embodiments, the middleware software layer may include a set of software instructions that may be utilized for processing and communications in a real time operating system (RTOS) of a distributed vehicle network environment. For example, in one embodiment, the computing system (e.g., advanced driver assistance system (ADAS)) of the vehicle may be programmably retrofitted with instructions including the middleware software layer. Specifically, for autonomous or semi-autonomous vehicles, the middleware software layer, in conjunction with a hardware abstraction layer (HAL), may translate and abstract information of the vehicle operating system, autonomy stack, controller area network (CAN) bus, high-level and low-level applications data, and so forth, for analyzing, managing, and segmenting these various data to improve the vehicle autonomy operation of the vehicle. Thus, the middleware software layer may serve as a reconfigurable and/or retrofittable software-based system for managing processing and communications of the autonomy stack of the vehicle to improve overall security, fault-tolerance, and reliability of the various modules and submodules comprising an autonomous or semi-autonomous vehicle, and may be further scalable for Level-1 autonomous driving, Level-2 autonomous driving, Level-3 autonomous driving, Level-4 autonomous driving, and Level-5 autonomous driving.

Figure 1:
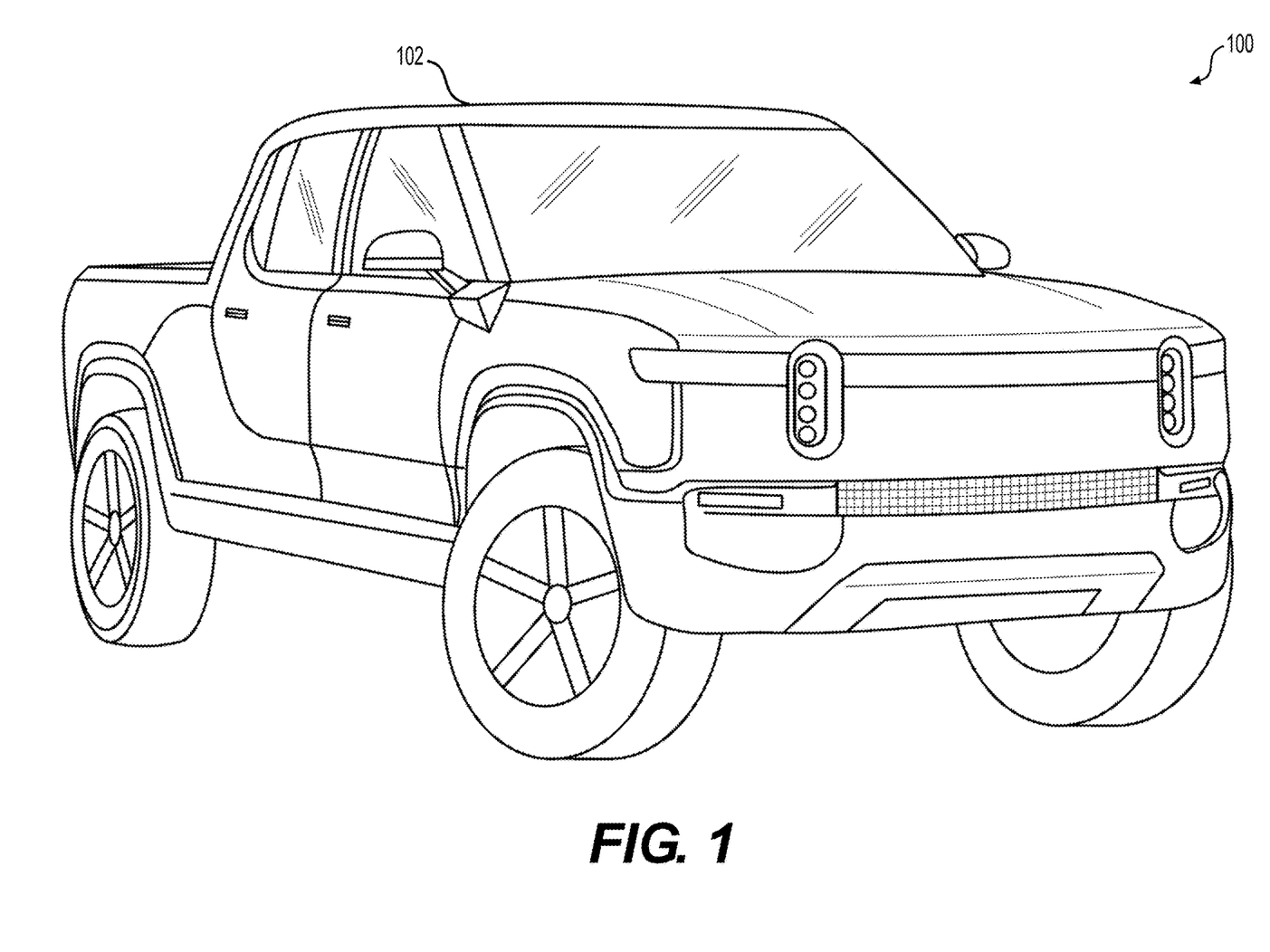
FIG. 1 illustrates an example embodiment of a vehicle environment including a vehicle.

FIG. 1 illustrates an example embodiment of a vehicle environment 100 including a vehicle 102, in accordance with the presently disclosed embodiments. As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments. In one embodiment, the vehicle 102 may include a gasoline-powered vehicle that may be propelled, for example, by an internal combustion engine (ICE) or other fuel-injection engine. In certain embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In some embodiments, the vehicle 102 may include an autonomous or semi-autonomous vehicle suitable for operating, for example, in accordance with Level-1 autonomous driving, Level-2 autonomous driving, Level-3 autonomous driving, Level-4 autonomous driving, Level-5 autonomous driving, or switching between the different levels of autonomous driving functionality. While the present embodiments may be discussed herein primarily with respect to an autonomous or semi-autonomous passenger vehicle, it should be appreciated that the present embodiments may applied to any type of autonomous or semi-autonomous vehicle (e.g., aircrafts, watercrafts, railcars, semi-trailer trucks, farming vehicles, rover vehicles, buses, and so forth) that may operate in accordance with Level-1 autonomous driving, Level-2 autonomous driving, Level-3 autonomous driving, Level-4 autonomous driving, or Level-5 autonomous driving. Further, while the present embodiments may be discussed primarily with respect to the example embodiment of a personal passenger vehicle 102, it should be appreciated that, in other embodiments, the vehicle 102 may be one of a fleet of similar vehicle 102 (e.g., a fleet of delivery vans, a fleet of police vehicles, a fleet of taxis, or a fleet of food-service vehicles).

Figure 2A:
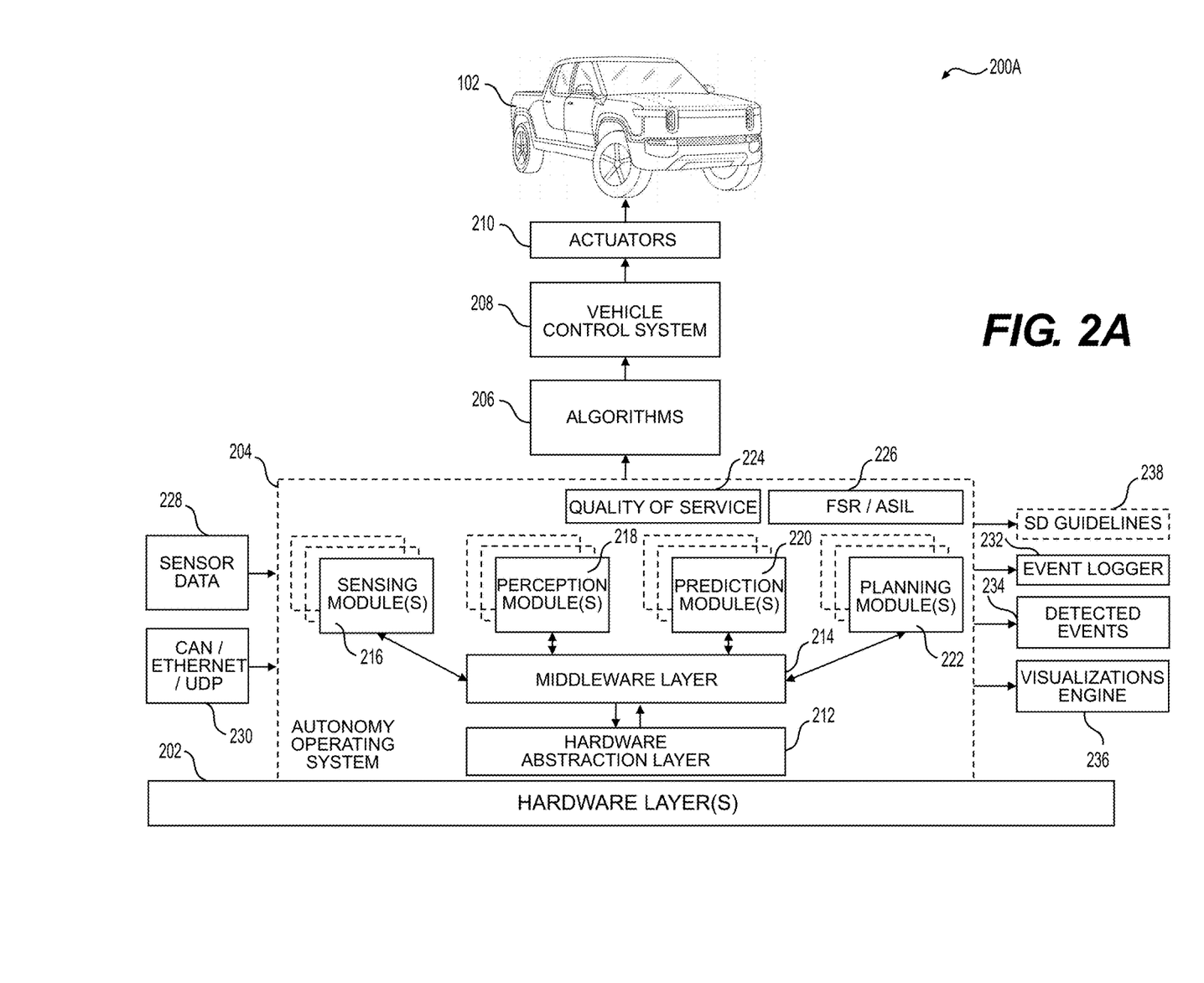
FIG. 2A illustrates an example embodiment of a computing system architecture of a vehicle including a middleware software layer that may be utilized to manage processing and communications of an autonomy stack.

FIG. 2A illustrates an example embodiment of a computing system architecture 200A of a vehicle including a middleware software layer that may be utilized to manage processing and communications of an autonomy stack, in accordance with the presently disclosed embodiments. As depicted, the computing system architecture 200A may include one or more hardware layer(s) 202, a vehicle autonomy operating system 204, one or more algorithms 206 (e.g., rule-based algorithms), a vehicle control system 208, and actuators 210 for controlling one or more drive actions of the vehicle 102. In certain embodiments, the autonomy operating system 204 may include a hardware abstract layer (HAL) 212, a middleware layer 214, an autonomy stack including a sensing module 216, a perception module 218, a prediction module 220, and a planning module 222, a quality of service (QoS) block 224, and a functional safety requirements (FSR)/automotive safety integrity level (ASIL) block 226.

In certain embodiments, the autonomy operating system 204 may receive sensor data 228 and messages via one or more communications protocols 230 (e.g., CAN, Ethernet, user datagram protocol (UDP)). For example, in some embodiments, the sensor data 228 may include, for example, two-dimensional (2D) image data captured by one or more cameras of the vehicle 102, three-dimensional (3D) point cloud data captured by one or more light detection and ranging (LiDAR) sensors of the vehicle 102, data captured by one or more radars of the vehicle 102, 2D map or 3D map data, or other sensor data capturing the external environment (e.g., agents including other vehicles, pedestrians, bicyclists, as well as roads, road signs, traffic lights, and so forth) of the vehicle 102. In certain embodiments, the sensor data 228 may be received by the sensing module 216, which may include a processing module utilized to perform, for example, a sensor data fusion of the various sensor data 228 (e.g., LiDAR data, camera data, radar data, and so forth) for creating a 360° view around the vehicle 102 (e.g., with respect to itself).

In certain embodiments, the sensing module 216 may then provide a sensing output to the middleware layer 214, which may, in some embodiments, process and verify the sensing output before publishing the sensing output to the perception module 218. In certain embodiments, the perception module 218 may include one or more processing modules that may be utilized to inform the vehicle 102 of the position and orientation of other vehicles, pedestrians, bicyclists, and so forth based on the fused sensor data. For example, the perception module 218 may include one or more machine-learning models (e.g., computer vision models) for allowing the vehicle to "see" or ascertain all of the agents within the environment of the vehicle 102. In certain embodiments, the perception module 218 may then provide a perception output to the middleware layer 214, which may, in some embodiments, process and verify the perception output before publishing to the prediction module 220.

In certain embodiments, the prediction module 220 may include one or more processing modules that may be utilized to predict what is likely to occur within the next 5-10 seconds in the environment of the vehicle 102 based on the perception output generated by the perception module 218. Specifically, the prediction module 220 may include one or more machine-learning models for predicting or anticipating the manner in which one or more driving scenarios (e.g., a pedestrian crossing a crosswalk, a vehicle stopping at a traffic light, a bicyclist making a right turn, and so forth) will play out beforehand with a high-level of precision and accuracy. In certain embodiments, the prediction module 220 may then provide a prediction output to the middleware layer 214, which may, in some embodiments, process and verify the prediction output before publishing to the planning module 222. In certain embodiments, the planning module 220 may include one or more processing modules that may be utilized to plan a trajectory for the vehicle 102 to follow and/or one or more drive actions for the vehicle 102 to perform, for example, within the next 5-10 seconds based on the prediction output received from the prediction module 220. In certain embodiments, the sensing module 216, the perception module 218, the prediction module 220, and the planning module 222 may collectively comprise the autonomy stack of the vehicle 102, and may exchange data between modules by way of the one or more communications protocols 230 (e.g., CAN, Ethernet, UDP).

In certain embodiments, as further depicted by FIG. 2A, the sensing module 216, the perception module 218, the prediction module 220, and the planning module 222 may each publish one or more messages to, for example, the middleware layer 214 via the one or more communications protocols 230 (e.g., CAN, Ethernet, UDP) and further receive one or messages from the middleware layer 214 based on or more subscriptions of the sensing module 216, the perception module 218, the prediction module 220, and the planning module 222. For example, the perception module 218 may be subscribed to messages published by the middleware layer 214 regarding the sensing output generated by the sensing module 216; the prediction module 220 may be subscribed to messages published by the middleware layer 214 regarding the perception output generated by the perception module 218; the planning module 222 may be subscribed to messages published by the middleware layer 214 regarding the prediction output generated by the prediction module 220; and so on, and so forth.

In certain embodiments, the middleware layer 214 may include a data distribution service (DDS) middleware utilized for processing and communications in a real time operating system (RTOS) of a distributed vehicle environment. For example, in some embodiments, the middleware layer 214 may include a publish-subscribe (PubSub) architecture, which may be utilized, for example, to ensure that the application (e.g., (QoS block 224, FSR/ASIL block 226) or module (e.g., the sensing module 216, the perception module 218, the prediction module 220, the planning module 222, the vehicle control system 208) publishing messages and the application (e.g., (QoS block 224, FSR/ASIL block 226) or processing module (e.g., the sensing module 216, the perception module 218, the prediction module 220, and the planning module 222) receiving the messages may be independent of each other. In this way, the application (e.g., (QoS block 224, FSR/ASIL block 226) or module (e.g., the sensing module 216, the perception module 218, the prediction module 220, the planning module 222, the vehicle control system 208) that publishes messages need not keep track of the application (e.g., (QoS block 224, FSR/ASIL block 226) or module (e.g., the sensing module 216, the perception module 218, the prediction module 220, the planning module 222, the vehicle control system 208) by which the published messages are received.

Instead, in certain embodiments, the middleware layer 214 may keep track of all the applications (e.g., QoS block 224, FSR/ASIL block 226) or processing modules (e.g., the sensing module 216, the perception module 218, the prediction module 220, the planning module 222, the vehicle control system 208) and transmit published messages to only those applications (e.g., (QoS block 224, FSR/ASIL block 226) or processing modules (e.g., the sensing module 216, the perception module 218, the prediction module 220, the planning module 222, the vehicle control system 208) that have previously subscribed to receive messages from a corresponding application or module. In certain embodiments, the middleware layer 214 may further allow the processing modules (e.g., the sensing module 216, the perception module 218, the prediction module 220, the planning module 222, the vehicle control system 208) to be run in redundancy as will be discussed below in further detail below with respect to FIG. 2B.

In certain embodiments, the middleware layer 214 may also monitor and manage the QoS block 224 and the FSR/ASIL block 226. For example, the QoS block 224 may process and store one or more QoS parameters associated with the sensing module 216, the perception module 218, the prediction module 220, and the planning module 222. In one embodiment, the FSR/ASIL block 226 may include, for example, a number of safety-critical functions or regulatory certifications by which the applications and processing modules of the vehicle 102 are to adhere. In another embodiment, the FSR/ASIL block 226 may include, for example, a risk classification system and standard for the functional safety of the vehicle 102. For example, in some embodiments, the middleware layer 214 may allow for hosting and supporting higher FSR/ASIL ratings as compared to what may be achievable via, for example, the hardware layer(s) 202 alone. In certain embodiments, the middleware layer 214 may include a number of safety checker mechanisms that may be suitable for independently computing and verifying a number of QoS parameters, vehicle parameters, and/or autonomous processing outputs associated with the sensing module 216, the perception module 218, the prediction module 220, and the planning module 222.

For example, middleware layer 214 may include instructions to generate redundancies or duplicates of the sensing module 216, the perception module 218, the prediction module 220, and the planning module 222 and comparing the outputs of the sensing module 216, the perception module 218, the prediction module 220, and the planning module 222 to the corresponding outputs of the redundancies or duplicates of the sensing module 216, the perception module 218, the prediction module 220, and the planning module 222. For example, in one embodiment, by allowing one or more the sensing module 216, the perception module 218, the prediction module 220, and the planning module 222 to be executed in redundancy and utilizing the redundancies of the sensing module 216, the perception module 218, the prediction module 220, and the planning module 222 as an added safety check against the original the sensing module 216, the perception module 218, the prediction module 220, and the planning module 222, the present embodiments may further improve the overall security, fault-tolerance, and reliability of the sensing module 216, the perception module 218, the prediction module 220, and the planning module 222.

In one embodiment, the redundancies or duplicates of the sensing module 216, the perception module 218, the prediction module 220, and the planning module 222 generated by the middleware layer 214 may include only one respective redundant module per one of the sensing module 216, the perception module 218, the prediction module 220, and the planning module 222. In other embodiments, the redundancies or duplicates of the sensing module 216, the perception module 218, the prediction module 220, and the planning module 222 generated by the middleware layer 214 may include any number (e.g., 2, 3, 4, 5, or N) per one of the sensing module 216, the perception module 218, the prediction module 220, and the planning module 222.

In some embodiments, the number of the redundancies or duplicates of the sensing module 216, the perception module 218, the prediction module 220, and the planning module 222 generated by the middleware layer 214 may be a function of the hardware layer(s) 202 and abstractions, and more specifically the number of processor cores, for example, available for executing the sensing module 216, the perception module 218, the prediction module 220, and the planning module 222 and their corresponding redundancies (e.g., 9 processing cores may be suitable for hosting and executing 3 redundant processing modules on 3 processing cores each, 6 processing cores may be suitable for hosting and executing 2 redundant processing modules on 2 processing cores each, and so forth).

In some embodiments, the number of QoS parameters, vehicle parameters, and/or autonomous processing outputs that may be independently processed and verified utilizing the number of safety checker mechanisms of the middleware layer 214 may include one or more of a throughput parameter, a reliability parameter, an intermediate delay parameter, a network capacity parameter, a packet loss parameter, a packet latency parameter, a packet delivery deadline parameter, a power consumption parameter, a network bandwidth parameter, a response time parameter, a connectivity parameter, or a path latency parameter. For example, in some embodiments, the number of safety checker mechanisms may independently determine whether messages are being published and received between the sensing module 216, the perception module 218, the prediction module 220, and the planning module 222 in accordance with, for example, expected response times or delivery deadlines. If not, the middleware layer 214 may determine that a potential fault or failure has occurred somewhere within the distributed network of the vehicle 102.

Figure 2B:
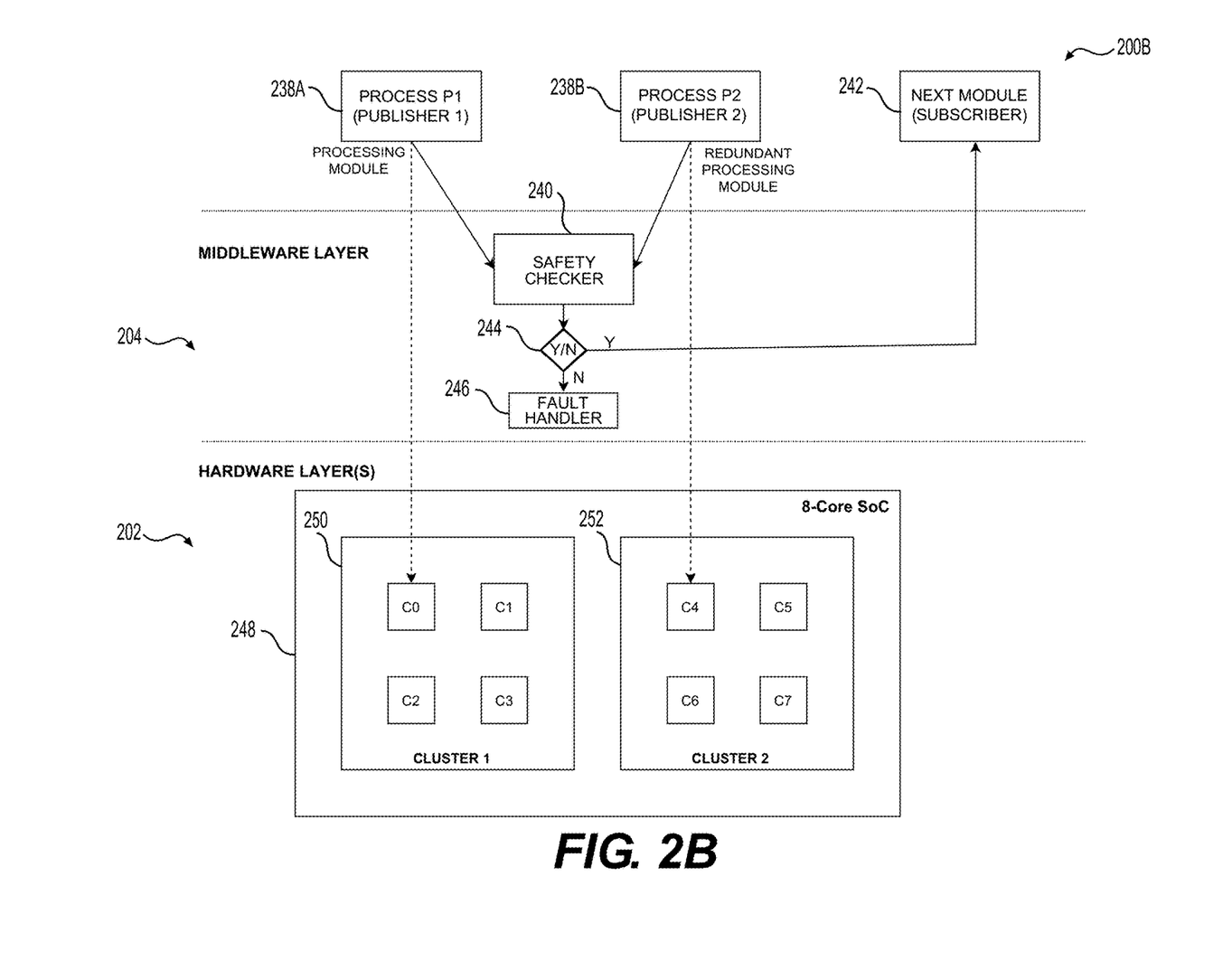
FIG. 2B illustrates another example embodiment of a computing system architecture of a middleware software layer and hardware layer that may be utilized to manage processing and communications of an autonomy stack.

In other embodiments, as will be further discussed with respect to FIG. 2B, the number of safety checker mechanisms may be suitable for independently computing and verifying a number of QoS parameters, vehicle parameters, and/or autonomous processing outputs associated with the sensing module 216, the perception module 218, the prediction module 220, and the planning module 222 by, for example, generating duplicates of the sensing module 216, the perception module 218, the prediction module 220, and the planning module 222 and comparing the outputs of the sensing module 216, the perception module 218, the prediction module 220, and the planning module 222 to the corresponding outputs of the duplicates of the sensing module 216, the perception module 218, the prediction module 220, and the planning module 222.

Thus, in certain embodiments, the number of safety checker mechanisms may independently compute and verify the number of QoS parameters, vehicle parameters, and/or autonomous processing outputs associated with the sensing module 216, the perception module 218, the prediction module 220, and the planning module to ensure security, fault-tolerance, and reliability of the vehicle 102 by utilizing the independent computations and verifications to determine when the vehicle 102 is to disengage (e.g., cease autonomous driving operation of the vehicle 102 and return control of the driving operation to a supervisory driver or owner of the vehicle 102). In one embodiment, the number of QoS parameters, vehicle parameters, and/or autonomous processing outputs that may be independently processed and verified utilizing the number of safety checker mechanisms of the middleware 214 may include one or more driving parameters (e.g., one or more of a vehicle 102 velocity, vehicle 102 steering angle, vehicle 102 acceleration, vehicle 102 lateral acceleration, vehicle 102 positioning, vehicle 102 throttle position, vehicle 102 torque, vehicle 102 jerk, vehicle 102 fuel range, vehicle 102 charge range, vehicle 102 air-to-fuel ratio, vehicle 102 altitude, vehicle 102 passenger comfortability, vehicle 102 ride smoothness, and so forth).

In another embodiment, the number of QoS parameters, vehicle parameters, and/or autonomous processing outputs that may be independently processed and verified utilizing the number of safety checker mechanisms of the middleware 214 may include one or more driving scenarios (e.g., a pedestrian crossing a crosswalk, a vehicle stopping at a traffic light, a bicyclist making a right turn, and so forth) that may be independently processed and verified utilizing the number of safety checker mechanisms of the middleware layer 214. For example, the number of safety checker mechanisms may independently determine, for example, whether both the LiDARs and the cameras have captured the pedestrian crossing a crosswalk, or whether the perception module 218 has published the perception output, the prediction module 220 has published the prediction output, and the planning module 222 has received the prediction output published by the prediction module 220, all within one or more delivery deadlines, for example.

In certain embodiments, the middleware layer 214 may verify the number of QoS parameters, vehicle parameters, and/or autonomous processing outputs independently computed utilizing the number of the safety checker mechanisms of the middleware layer 214 by comparing the independently computed number of QoS parameters, vehicle parameters, and/or autonomous processing outputs. For example, in one embodiment, the middleware layer 214 may determine whether a first vehicle parameter computed by one or more of the sensing module 216, the perception module 218, the prediction module 220, and the planning module 222 and a second vehicle parameter computed by, for example, a corresponding redundancy or a duplicate of one or more of the sensing module 216, the perception module 218, the prediction module 220, and the planning module 222 satisfy a similarity threshold value.

In certain embodiments, in response to determining that the similarity comparison of the first vehicle parameter and the second vehicle parameter does not satisfy the similarity threshold value, the middleware layer 214 may then provide one or more instructions to the vehicle control system 208 for controlling one or more actuators 210 to cause the vehicle 102 to perform one or more actions. In certain embodiments, the one or more actions to be performed by the vehicle 102 may be defined by a list of algorithms 206 (e.g., rule-based algorithms). For example, in one embodiment, the middleware layer 214 may instruct the vehicle control system 208 to cause the vehicle 102 to disengage (e.g., cease autonomous driving operation and return control of the driving operation to a supervisory driver or owner of the vehicle 102).

In another embodiment, the middleware layer 214 may instruct the vehicle control system 208 control the one or more actuators 210 to cause the vehicle 102 to perform one or more specific drive actions. For example, in some embodiments, the vehicle control system 208 may cause the vehicle 102 to perform one or more drive actions including, for example, a braking, a change in velocity, a change in steering angle, a change in acceleration, a change in throttle position, or an output of one or more alerts (e.g., output and display one or more alarms, warnings, or other notifications). In certain embodiments, in response to determining that the similarity comparison of the first vehicle parameter and the second vehicle parameter satisfies the similarity threshold value, the middleware layer 214 may forgo instructing the vehicle control system 208, and thus allowing the continued uninterrupted autonomous driving operation of the vehicle 102.

In some embodiments, in response to determining that the first vehicle parameter fails to satisfy the similarity threshold value with the second vehicle parameter, the middleware layer 214 may determine a confidence score (e.g., a value ranging from "0" to "100" indicating confidence or trust) associated with the first vehicle parameter or the second vehicle parameter, and determine whether to provide the instruction to the vehicle control system 208 based on the confidence score. For example, in one embodiment, the first vehicle parameter may have been computed utilizing, for example, more powerful processing resources of the hardware layer(s) 202 as compared to the processing resources of the hardware layer(s) 202 utilized for computing the second vehicle parameter. In such a case, the middleware layer 214 may assign a higher confidence score to the first vehicle parameter, and thus trust that the first vehicle parameter is correct as compared to the second vehicle parameter.

In certain embodiments, the middleware layer 214 may further manage processing and communications between applications (e.g., QoS block 224, FSR/ASIL block 226) or processing modules (e.g., the sensing module 216, the perception module 218, the prediction module 220, the planning module 222, the vehicle control system 208) by managing memory and communications resources. For example, in one embodiment, the middleware layer 214 may allocate a first memory space on the hardware layer(s) 202 for storing safety-critical functions and a second memory space on the hardware layer(s) 202 for storing non-safety-critical functions. For example, in some embodiments, the middleware layer 214 may allocate only embedded, non-volatile memory space or memory or storage that may be server-backed to be utilized to store safety-critical functions, while less permanent or temporary memory space may be allocated and utilized for non-safety-critical functions. This may allow the safety-critical functions to be stored and accessed separately from the non-safety-critical functions to preclude latency in accessing safety-critical functions. In certain embodiments, the middleware layer 214 may further allocate a first set of communication channels for receiving and transmitting safety-critical functions and a second set of communication channels for receiving and transmitting non-safety-critical functions. For example, in some embodiments, the middleware layer 214 may allocate low-latency and high-data-throughput communications channels for receiving and transmitting safety-critical functions. This may allow the safety-critical functions to be received and transmitted separately from the non-safety-critical functions to increase data throughput and network bandwidth for the safety-critical functions.

In certain embodiments, as further depicted by FIG. 2A, the vehicle autonomy operating system 204 may also provide one or more outputs to an event logger 232, replay of recorded vehicle data engine 234, and visualizations engine 236 for providing real-time visualizations of the sensor data 228 or other vehicle data. In certain embodiments, the event logger 232, replay of detected events engine 234, and visualizations engine 236 may collectively allow, for example, the sensor data 228 (e.g., 2D and 3D sensor data from LiDARs, radars, and cameras and/or map data) to be displayed to a supervisory driver, passenger, or owner of the vehicle 102 by way of the in-vehicle infotainment (IVI) system of the vehicle 102.

FIG. 2B illustrates another example embodiment of a computing system architecture 200B of a middleware layer and hardware layer that may be utilized to manage processing and communications of an autonomy stack, in accordance with the presently disclosed embodiments. In certain embodiments, one or more autonomous processing outputs associated with the sensing module 216, the perception module 218, the prediction module 220, or the planning module 222 may be independently processed and verified by, for example, generating redundancies or duplicates of the sensing module 216, the perception module 218, the prediction module 220, or the planning module 222 and comparing the autonomous processing outputs of the sensing module 216, the perception module 218, the prediction module 220, or the planning module 222 to the corresponding autonomous processing outputs of the duplicate of the sensing module 216, the perception module 218, the prediction module 220, or the planning module 222.

For example, as depicted by FIG. 2B, an autonomous processing module 238A and a duplicate autonomous processing module 238B may be provided. For example, in one embodiment, the autonomous processing module 238A may be one of the sensing module 216, the perception module 218, the prediction module 220, or the planning module 222 as discussed above with respect to FIG. 2A. In certain embodiments, the duplicate autonomous processing module 238B may be an autonomous processing module that may be identical to, and executed in redundancy of the autonomous processing module 238A. In certain embodiments, the middleware layer 214 may process and verify a first autonomous processing output generated by the autonomous processing module 238A and a second autonomous processing output generated by the duplicate autonomous processing module 238B by comparing the first autonomous processing output against the second autonomous processing output utilizing a safety checker mechanism 240. In certain embodiments, the first autonomous processing output and the second autonomous processing output may be processed and verified utilizing the safety checker mechanism 240 prior to the first autonomous processing output or the second autonomous processing output being published to the next autonomous processing module 242.

In certain embodiments, the safety checker mechanism 240 may compare the first autonomous processing output against the second autonomous processing output to determine whether a similarity comparison of the first autonomous processing output and the second autonomous processing output satisfies a similarity threshold value. In certain embodiments, in response to determining (decision function 244) that the similarity comparison of the first autonomous processing output and the second autonomous processing output satisfies the similarity threshold value, the first autonomous processing output may be then published to the next autonomous processing module 242. On the other hand, in response to determining (decision function 244) that the similarity comparison of the first autonomous processing output and the second autonomous processing output does not satisfy the similarity threshold value, the first autonomous processing output may not be published to the next autonomous processing module 242, and, instead, the safety checker mechanism 240 may generate an output to the fault handler 246. For example, as generally discussed above with respect to FIG. 2A, the fault handler 246 (of the middleware layer 214) may provide one or more instructions to the vehicle control system 208 for controlling one or more actuators 210 to cause the vehicle 102 to perform one or more actions.

In some embodiments, further in response to determining (decision function 244) that the similarity comparison of the first autonomous processing output and the second autonomous processing output fails to satisfy the similarity threshold value, the middleware layer 214 may determine a confidence score (e.g., a value ranging from "0" to "100" indicating confidence or trust) associated with the first autonomous processing output or the second autonomous processing output, and determine whether to provide the first autonomous processing output to the next autonomous processing module 242 based on the confidence score.

For example, in one embodiment, the first autonomous processing output may have been computed utilizing, for example, more powerful processing resources (e.g., cluster of processing cores 250 "C0", "C1", "C2", and "C3") of a multicore system-on-chip (SoC) device 248 as compared to the processing resources (e.g., cluster of processing cores 252 "C4", "C5", "C6", and "C7") of the multicore SoC device 248 utilized for computing the second autonomous processing output. In such a case, the middleware layer 214 may assign a higher confidence score to the first autonomous processing output, and thus trust that the first autonomous processing output is correct as compared to the second autonomous processing output. It should be appreciated that the multicore SoC device 248 may represent only one of example of the presently disclosed embodiments. In other embodiments, the first autonomous processing output and the second autonomous processing output may be computed utilizing, for example, one or more microcontrollers that may be included as part of the hardware layer(s) 202.

In certain embodiments, as depicted by FIG. 2B, and for purposes of further improving the overall security, fault-tolerance, and reliability of the sensing module 216, the perception module 218, the prediction module 220, and the planning module 222, for example, the middleware layer 214 may define one or more processing core affinities for computing the first autonomous processing output and the second autonomous processing output and/or for hosting and executing one or more of the sensing module 216, the perception module 218, the prediction module 220, and the planning module 222 and corresponding redundancies of the sensing module 216, the perception module 218, the prediction module 220, and the planning module 222. In one embodiment, the middleware layer 214 may define processing core affinities, for example, to prevent potential erroneous computations caused by faults that may occur with respect to one or more processing cores of either the cluster of processing cores 250 (e.g., "C0", "C1", "C2", and "C3") or the cluster of processing cores 252 (e.g., "C4", "C5", "C6", and "C7"). For example, in certain embodiments, the first autonomous processing output and the second autonomous processing output may be computed utilizing "batches" or clusters of processing cores that may operate in conjunction.

In one embodiment, the middleware layer 214 may define a processing core affinity that the first autonomous processing output be computed always utilizing, for example, the cluster of processing cores 250 (e.g., "C0", "C1", "C2", and "C3"). Similarly, the middleware layer 214 may define a processing core affinity that the second autonomous processing output be computed always utilizing, for example, the cluster of processing cores 252 (e.g., "C4", "C5", "C6", and "C6"). Indeed, in certain embodiments, by computing the first autonomous processing output utilizing the cluster of processing cores 250 (e.g., "C0", "C1", "C2", and "C3") and computing the second autonomous processing output utilizing the cluster of processing cores 252 (e.g., "C4", "C5", "C6", and "C7"), the middleware layer 214 may ensure that the first autonomous processing output and the second autonomous processing output are computed completely independent of each other.

In this way, for example, if there were one or more faults occurring with respect to one or more processing cores of the cluster of processing cores 252 (e.g., "C4", "C5", "C6", and "C7"), and both the first autonomous processing output and the second autonomous processing output were computed utilizing the same cluster of processing cores 252 (e.g., "C4", "C5", "C6", and "C7"), then both the first autonomous processing output and the second autonomous processing output would be computed based on the same fault conditions and thus match to each other (e.g., match with respect to each of the first autonomous processing output and the second autonomous processing output being incorrect or erroneous). Accordingly, by the middleware layer 214 defining one or more processing core affinities ensuring that the first autonomous processing output and the second autonomous processing output are computed completely independent of each other, the middleware layer 214 may further improve the overall security, fault-tolerance, and reliability of the sensing module 216, the perception module 218, the prediction module 220, and the planning module 222, in accordance with the presently disclosed embodiments.

Figure 3:
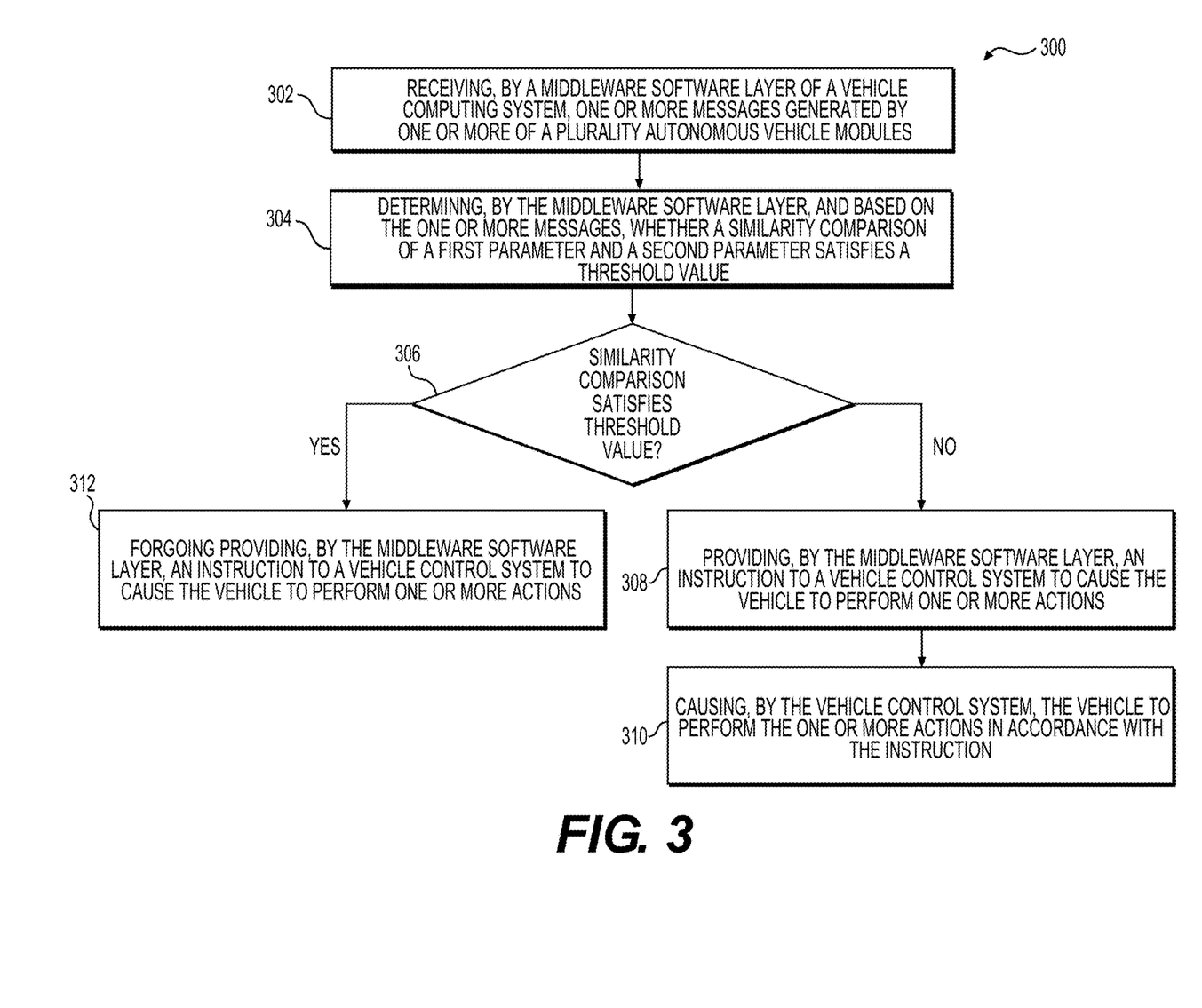
FIG. 3 illustrates a flow diagram of a method for providing a middleware software layer of a computing system of a vehicle that may be utilized to manage processing and communications of an autonomy stack.

FIG. 3 illustrates a flow diagram of a method 300 for providing a middleware software layer of a computing system of an autonomous or semi-autonomous vehicle that may be utilized to manage processing and communications of an autonomy stack of the vehicle to improve overall security, fault-tolerance, and reliability, in accordance with the presently disclosed embodiments. The method 300 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), or any other processing device(s) that may be suitable for processing various vehicle data and making one or more decisions based thereon), software (e.g., instructions running/executing on one or more processors), firmware (e.g., microcode), or some combination thereof.

The method 300 may begin at block 302 with one or more processing devices receiving, by the middleware software layer of the computing system, one or more messages published by at least one of a plurality of autonomous processing modules of the computing system. For example, in some embodiments, the middleware layer 214 may include a DDS middleware, which may include a Pub Sub architecture configured to allow the middleware layer 214 to subscribe to one or more of a number of topics associated with the number of autonomous processing modules 216, 218, 220, and 222. Thus, in some embodiments, the middleware layer 214 may receive the one or more messages based on the subscription. The method 300 may continue at block 304 with one or more processing devices determining, by the middleware software layer, and based on the one or more published messages, whether a similarity comparison of a first vehicle parameter and a second vehicle parameter satisfy a similarity threshold value, in which the first vehicle parameter and the second vehicle parameter relate to the one or more messages published by the one or more of the plurality of autonomous processing modules and independently processed by the middleware software layer. For example, in certain embodiments, the middleware layer 214 may determine whether the similarity comparison of the first vehicle parameter and the second vehicle parameter satisfy the similarity threshold value by comparing the first vehicle parameter and the second vehicle parameter utilizing one or more safety checker mechanisms 240, for example.

In certain embodiments, in response to determining, by the middleware software layer, that the similarity comparison of the first vehicle parameter and the second vehicle parameter fails to satisfy the similarity threshold value at decision 306, the method 300 may continue at block 308 with one or more processing devices providing, by the middleware software layer, an instruction to a control system configured to cause the vehicle to perform one or more actions. The method 300 may then continue at block 310 with one or more processing devices causing, by the control system, the vehicle to perform the one or more actions in accordance with the instruction. For example, in certain embodiments, the vehicle 102 may include an autonomous or semi-autonomous vehicle 102 that may be suitable for operating in accordance with one or more of Level-1 autonomous driving, Level-2 autonomous driving, Level-3 autonomous driving, Level-4 autonomous driving, or Level-5 autonomous driving.

Accordingly, in some embodiments, in response to determining that the similarity comparison of the first vehicle parameter and the second vehicle parameter fails to satisfy similarity threshold value, the middleware layer 214 may provide an instruction to the control system 208 to cause the vehicle 102 to perform one or more actions including, for example, a disengagement, a braking, a change in velocity, a change in steering angle, a change in acceleration, a change in throttle position, or an output of one or more alerts. On the other hand, in response to determining, by the middleware software layer, that the similarity comparison of the first vehicle parameter and the second vehicle parameter satisfies similarity threshold value at decision 306, the method 300 may conclude at block 312 with one or more processing devices forgoing, by the middleware software layer, the provision of the instruction to the control system 218.

Figure 4:
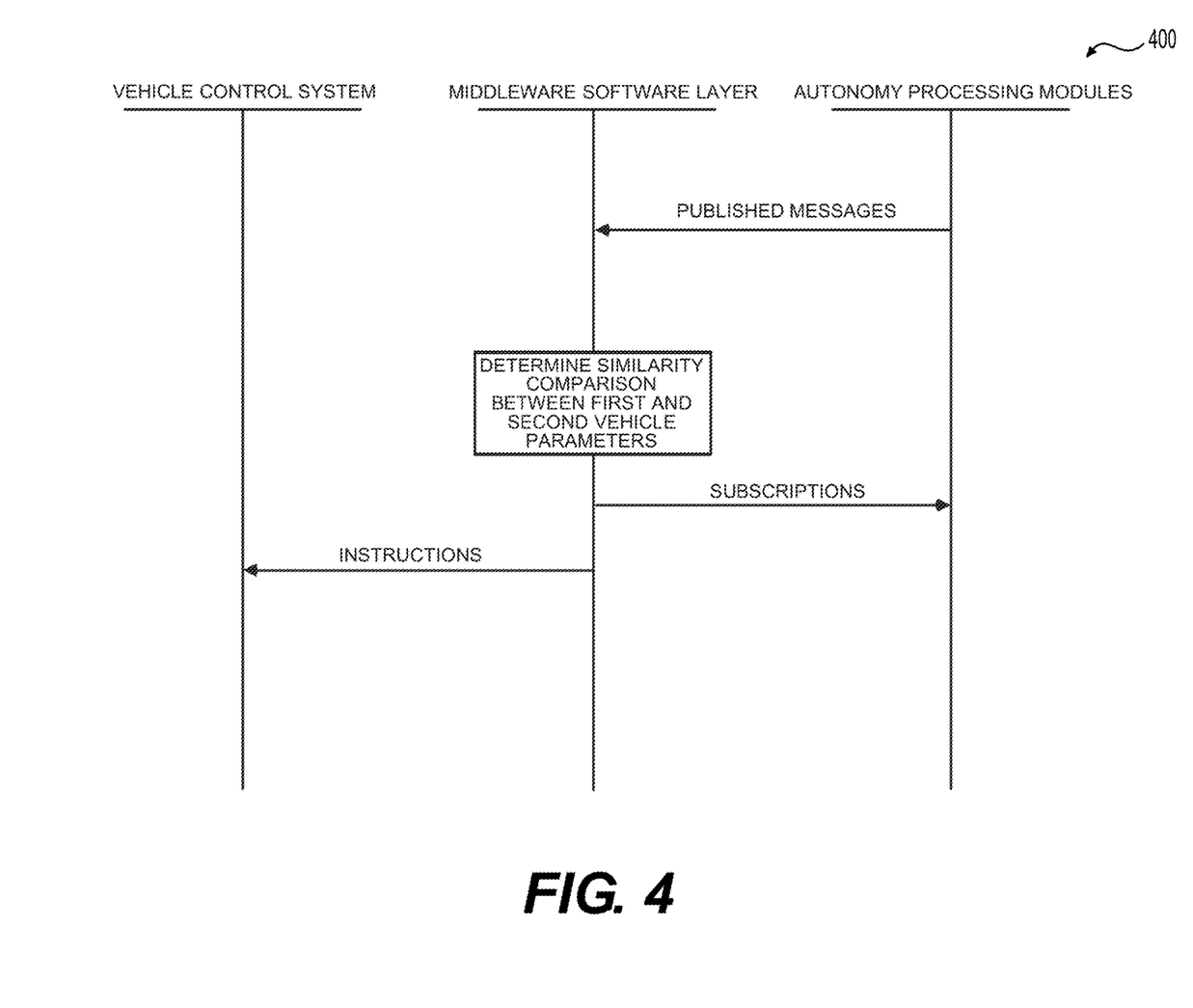
FIG. 4 is a diagram illustrating exchanges of data between one or more autonomy processing modules, a middleware software layer, and a vehicle control system of a computing system.

FIG. 4 is a diagram illustrating exchanges of data between one or more autonomy processing modules, a middleware software layer, and a vehicle control system of a computing system, in accordance with the presently disclosed embodiments. In certain embodiments, the middleware software layer may receive one or more messages published by at least one of a plurality of autonomous processing modules of the computing system. In certain embodiments, the middleware software layer may then determine, based on the one or more published messages, whether a similarity comparison of a first vehicle parameter and a second vehicle parameter satisfies a similarity threshold value, in which the first vehicle parameter and the second vehicle parameter relate to the one or more messages published by the one or more of the plurality of autonomous processing modules and independently processed by the middleware software layer. In certain embodiments, in response to determining that the similarity comparison of the first vehicle parameter and the second vehicle parameter fails to satisfy the similarity threshold value, the middleware software layer may then provide one or more instructions to the vehicle control system to cause the vehicle to perform one or more actions in accordance with the instruction.

Figure 5:
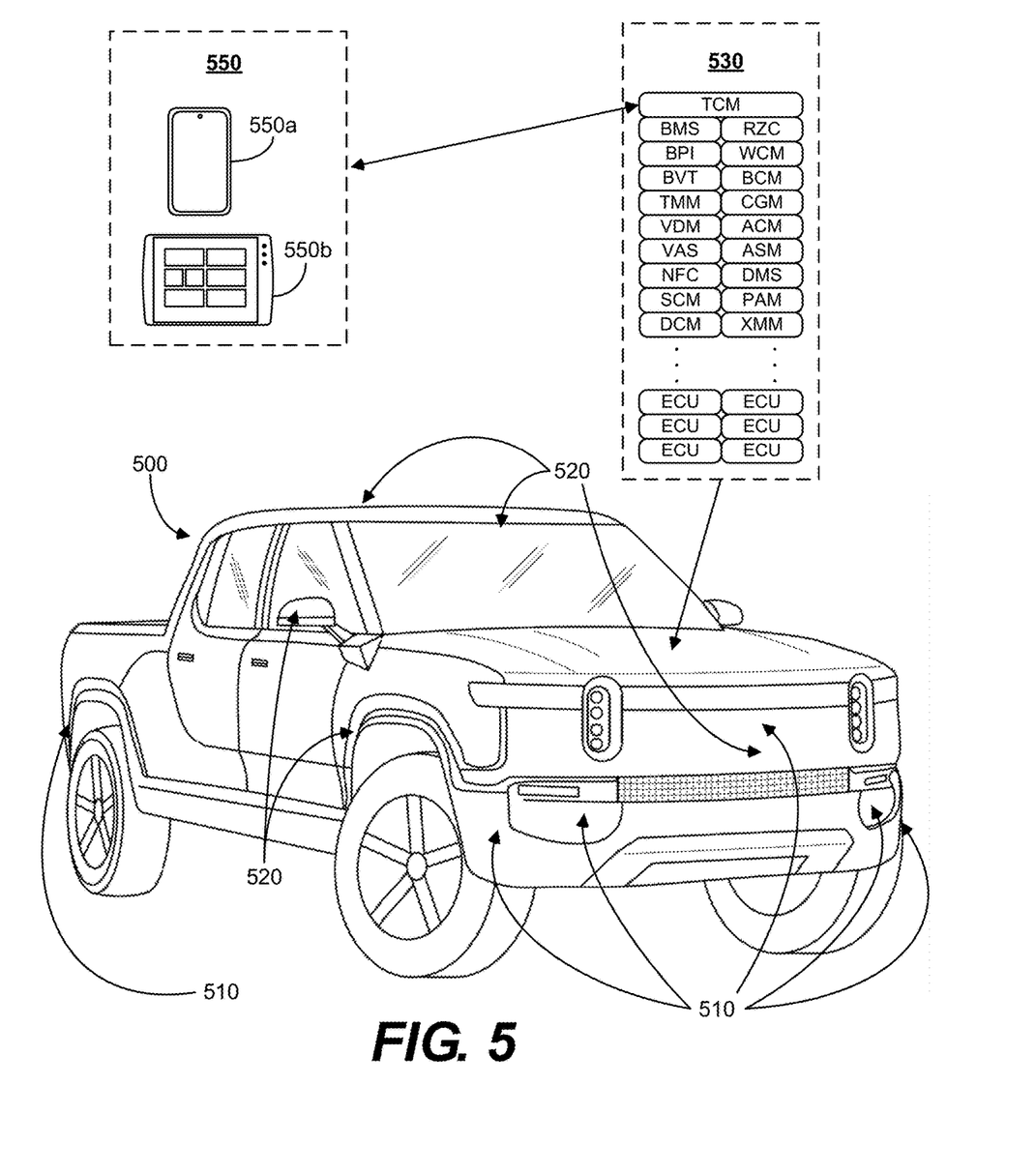
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof.

As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Figure 6A:
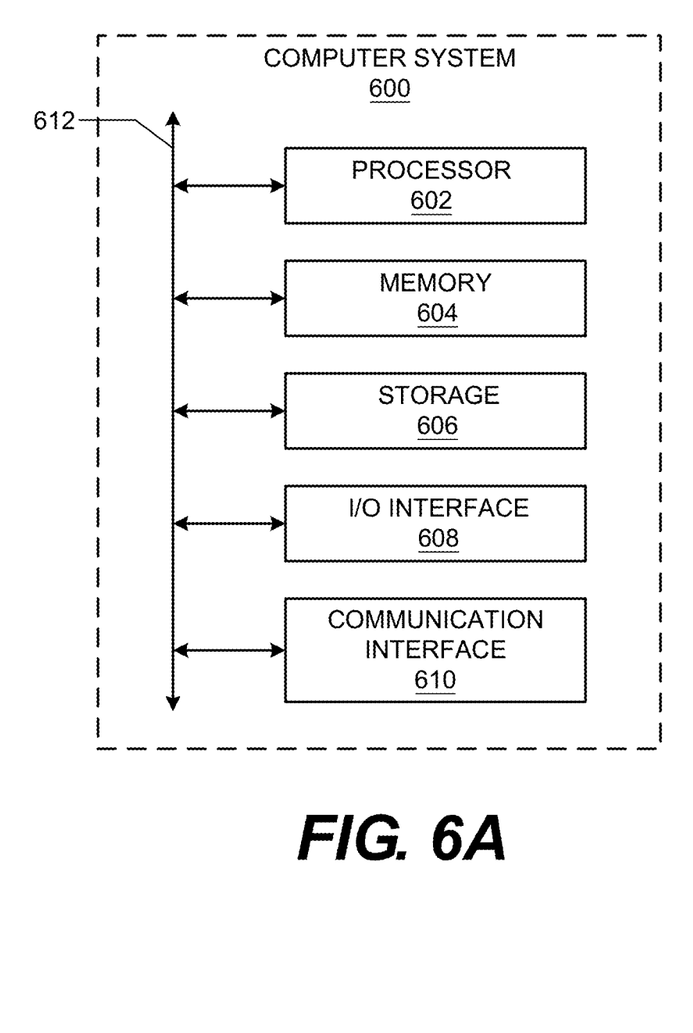
FIG. 6A is a schematic of an example computer system.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 520 and/or sensors 510. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 520 and/or sensors 510 in order to determine appropriate control commands.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530. In some embodiments, functions of the ACM and the XMM may be combined together into an Autonomous eXperience Module (AXM) ECU.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, and/or a Body Control Module (BCM) ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed; span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units 622 and 632) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units 624 and 634). Processor 602 may include one or more internal caches for data, instructions, or addresses.

In certain embodiments, memory 604 includes main memory for storing instructions for processor 602 to execute or data for processor 602 to operate on. In certain embodiments, one or more memory management units (MMUs) reside between processor 602 and memory 604 and facilitate accesses to memory 604 requested by processor 602. In certain embodiments, memory 604 includes random access memory (RAM). This disclosure contemplates any suitable RAM.

In certain embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In certain embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In certain embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In certain embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 6B:
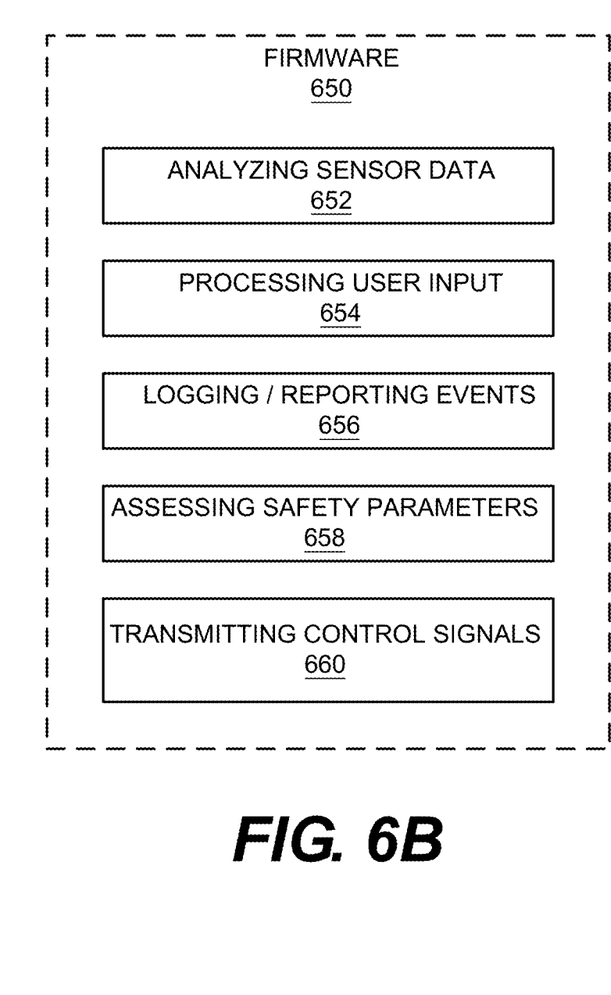
FIG. 6B illustrates example firmware for a vehicle ECU.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A computing system for a vehicle, comprising:
   one or more non-transitory computer-readable storage media including instructions; and
   one or more processors coupled to the one or more non-transitory computer-readable storage media, the one or more processors configured to execute the instructions to:
      receive, by a middleware software layer of the computing system, one or more messages published by one or more of a plurality of autonomous processing modules of the computing system, wherein the computing system is programmed with instructions comprising the middleware software layer;
      determine, by the middleware software layer, and based on the one or more messages, whether a similarity comparison of a first vehicle parameter and a second vehicle parameter satisfies a similarity threshold value;
      determine, by the middleware software layer, that the similarity comparison does not satisfy the similarity threshold value;
      determine, by the middleware software layer, a confidence score associated with the first vehicle parameter or the second vehicle parameter; and
      determine, by the middleware software layer, and based at least in part on the confidence score, whether to provide an instruction to a control system configured to cause the vehicle to perform one or more actions.

2. The computing system of claim 1, wherein the one or more of the plurality of autonomous processing modules comprises at least one redundant autonomous processing module.

3. The computing system of claim 1, wherein the first vehicle parameter comprises at least one parameter from a set of quality of service (QoS) parameters, and wherein the second vehicle parameter comprises the same at least one parameter from the set of QoS parameters.

4. The computing system of claim 3, wherein the set of QoS parameters comprises one or more of a throughput parameter, a reliability parameter, an intermediate delay parameter, a network capacity parameter, a packet loss parameter, a packet latency parameter, a packet delivery deadline parameter, a power consumption parameter, a network bandwidth parameter, a response time parameter, a connectivity parameter, and a path latency parameter.

5. The computing system of claim 1, wherein the one or more actions comprises a disengagement, a braking, a change in velocity, a change in steering angle, a change in acceleration, a change in throttle position, and an output of one or more alerts.

6. The computing system of claim 1, wherein the middleware software layer comprises a data distribution service (DDS) middleware.

7. The computing system of claim 1, wherein the middleware software layer comprises a publish-subscribe (PubSub) architecture configured to allow the middleware software layer to subscribe to one or more of a plurality of topics associated with the plurality of autonomous processing modules.

8. The computing system of claim 7, wherein the instructions to receive the one or more messages further comprise instructions to receive, by the middleware software layer, the one or more messages based on a subscription to the one or more of the plurality of topics associated with the plurality of autonomous processing modules.

9. The computing system of claim 1, wherein the middleware software layer is configured to allocate a first memory space on the computing system for storing safety-critical functions and a second memory space on the computing system for storing non-safety-critical functions.

10. The computing system of claim 1, wherein the middleware software layer is configured to allocate a first set of communication channels on the computing system for receiving and transmitting safety-critical functions and a second set of communication channels on the computing system for receiving and transmitting non-safety-critical functions.

11. The computing system of claim 1, wherein the instructions to determine whether the similarity comparison of the first vehicle parameter and the second vehicle parameter satisfies the similarity threshold value further comprises instructions to:
compute, by the middleware software layer, the first vehicle parameter based on one or more messages published by a first autonomous processing module of the plurality of autonomous processing modules;
compute, by the middleware software layer, the second vehicle parameter based on one or more messages published by a second autonomous processing module of the plurality of autonomous processing modules, wherein the second autonomous processing module comprises a redundancy of the first autonomous processing module; and
compare, by the middleware software layer, the first vehicle parameter and the second vehicle parameter utilizing one or more safety checker mechanisms.

12. The computing system of claim 1, wherein the instructions to determine the confidence score associated with the first vehicle parameter or the second vehicle parameter further comprise instructions to determine whether to trust the first vehicle parameter or the second vehicle parameter.

13. The computing system of claim 1, wherein the plurality of autonomous processing modules comprises one or more of a sensor processing module, a perception processing module, a prediction processing module, and a planning processing module.

14. The computing system of claim 1, wherein the one or more messages comprise a plurality of predictions from one or more machine-learning models of the computing system, the plurality of predictions describing a driving scenario involving the vehicle.

15. The computing system of claim 14, wherein a prediction processing module of the plurality of autonomous processing modules comprises the one or more machine-learning models.

16. The computing system of claim 1, wherein the one or more messages are published by a planning processing module of the plurality of autonomous processing modules, the planning processing module being configured to plan a driving action for the vehicle to perform based on the one or more messages.

17. The computing system of claim 1, wherein the vehicle is configured to operate in accordance with one or more of Level-1 autonomous driving, Level-2 autonomous driving, Level-3 autonomous driving, Level-4 autonomous driving, or Level-5 autonomous driving.

18. A non-transitory computer-readable medium comprising instructions that, when executed by one or more processors of a computing system, cause the one or more processors to:
receive, by a middleware software layer of the computing system, one or more messages published by one or more of a plurality of autonomous processing modules of the computing system, wherein the computing system is programmed with instructions comprising the middleware software layer;
determine, by the middleware software layer, and based on the one or more messages, whether a similarity comparison of a first vehicle parameter and a second vehicle parameter satisfies a similarity threshold value;
determine, by the middleware software layer, that the similarity comparison does not satisfy the similarity threshold value;
determine, by the middleware software layer, a confidence score associated with the first vehicle parameter or the second vehicle parameter; and
determine, by the middleware software layer, and based at least in part on the confidence score, whether to provide an instruction to a control system configured to cause a vehicle to perform one or more actions.

19. A method for providing a middleware software layer for autonomous or semiautonomous vehicles, comprising, at a computing system:
receiving, by the middleware software layer of the computer system, one or more messages published by one or more of a plurality of autonomous processing modules of the computing system, wherein the computing system is programmed with instructions comprising the middleware software layer;
determining, by the middleware software layer, and based on the one or more messages, whether a similarity comparison of a first vehicle parameter and a second vehicle parameter satisfies a similarity threshold value;
determining, by the middleware software layer, that the similarity comparison does not satisfy the similarity threshold value;
determining, by the middleware software layer, a confidence score associated with the first vehicle parameter or the second vehicle parameter; and
determining, by the middleware software layer, and based at least in part on the confidence score, whether to provide an instruction to a control system configured to cause a vehicle to perform one or more actions.

* * * * *